(12) United States Patent
Lee et al.

(10) Patent No.: US 10,678,836 B2
(45) Date of Patent: Jun. 9, 2020

(54) SLIDE SHOW-PROVIDING SYSTEM AND METHOD

(71) Applicant: Samsung Electronics Co., Ltd., Suwon-si, Gyeonggi-do (KR)

(72) Inventors: Dae-ho Lee, Daegu (KR); Chi-hyun Cho, Seoul (KR); Myeong-gi Jeong, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 694 days.

(21) Appl. No.: 14/547,536

(22) Filed: Nov. 19, 2014

(65) Prior Publication Data

US 2015/0149908 A1 May 28, 2015

(30) Foreign Application Priority Data

Nov. 22, 2013 (KR) .................. 10-2013-0143249

(51) Int. Cl.
*G06F 16/40* (2019.01)
*H04N 21/262* (2011.01)
*G11B 27/034* (2006.01)
*G11B 27/10* (2006.01)
*G11B 27/32* (2006.01)
*H04N 21/81* (2011.01)
*H04N 21/414* (2011.01)
*H04N 21/435* (2011.01)
(Continued)

(52) U.S. Cl.
CPC ............ *G06F 16/40* (2019.01); *G06F 3/0484* (2013.01); *G11B 27/034* (2013.01); *G11B 27/105* (2013.01); *G11B 27/322* (2013.01); *H04N 21/2353* (2013.01); *H04N 21/26258* (2013.01); *H04N 21/41407* (2013.01); *H04N 21/435* (2013.01); *H04N 21/8113* (2013.01)

(58) Field of Classification Search
CPC .......................... G06F 17/30017; G06F 16/40
USPC ........................................................ 715/730
See application file for complete search history.

(56) References Cited

U.S. PATENT DOCUMENTS 9,288,422 B2 * 3/2016 Cannistraro ............ G08C 17/00
2003/0085913 A1 * 5/2003 Ahmad .................... G06F 16/40
715/730
(Continued)

FOREIGN PATENT DOCUMENTS

GB          2479455 A       10/2011
KR     10-0706504 B1         4/2007
(Continued)

OTHER PUBLICATIONS

European Office Action dated Nov. 20, 2018; European Appln. No. 14 194 145.0-1209.

*Primary Examiner* — Sherrod L Keaton
(74) *Attorney, Agent, or Firm* — Jefferson IP Law, LLP

(57) ABSTRACT

A system and a method of providing metadata for a slide show to an external device are provided. The method includes determining a plurality of images for the slide show, grouping the determined plurality of images into a plurality of image groups, generating a plurality of metadata groups that respectively correspond to the plurality of image groups, and sequentially transmitting the generated plurality of metadata groups to the external device. The plurality of metadata groups include metadata regarding images included in an image group that corresponds to the plurality of metadata groups.

27 Claims, 12 Drawing Sheets

(51) Int. Cl.
*H04N 21/235* (2011.01)
*G06F 3/0484* (2013.01)

(56) References Cited

U.S. PATENT DOCUMENTS

| | | | |
|---|---|---|---|
| 2007/0010195 A1* | 1/2007 | Brown | H04H 60/73 455/3.06 |
| 2007/0300158 A1* | 12/2007 | Kasperkiewicz | G06F 16/40 715/731 |
| 2009/0210796 A1* | 8/2009 | Bhogal | G11B 27/034 715/730 |
| 2011/0113338 A1 | 5/2011 | Aoki et al. | |
| 2011/0289139 A1 | 11/2011 | McIntosh et al. | |
| 2012/0124143 A1* | 5/2012 | Chung | G06Q 10/107 709/206 |
| 2014/0344703 A1 | 11/2014 | Onuma et al. | |

FOREIGN PATENT DOCUMENTS

| | | |
|---|---|---|
| KR | 10-1230746 B1 | 1/2013 |
| WO | 2013/088962 A1 | 6/2013 |

* cited by examiner

FIG. 10

```xml
<?xml version="1.0" encoding="UTF-8"?>
<playlist version="" album=" " currentpage="" totalpage="">
    <itemList baseuri="">
        <item>
            <size></size>
            <type></type>
            <date></date>
            <uri></uri>
        </item>
    </itemList>
</playlist>
```

FIG. 11

```xml
<?xml version="1.0" encoding="UTF-8"?>
<playlist version="" album=" " currentpage="" totalpage="" update="">
    <itemList baseuri="">
        <item>
            <size></size>
            <type></type>
            <date></date>
            <uri></uri>
        </item>
    </itemList>
</playlist>
```

```
<?xml version="1.0" encoding="UTF-8"?>
<bgmlist version="">
    <bgm>
        <title></title>
        <album></album>
        <artist></artist>
        <uri></uri>
    </bgm>
</bgmlist>
```

SLIDE SHOW-PROVIDING SYSTEM AND METHOD

CROSS-REFERENCE TO RELATED APPLICATION(S)

This application claims the benefit under 35 U.S.C. § 119(a) of a Korean patent application filed on Nov. 22, 2013 in the Korean Intellectual Property Office and assigned Serial number 10-2013-0143249, the entire disclosure of which is hereby incorporated by reference.

TECHNICAL FIELD

The present disclosure relates to a system and a method of providing a slide show by using a plurality of metadata groups that are provided by a device to an external device. More particularly, the present disclosure relates to a method of playing a slide show by using metadata regarding images and music for the slide show.

BACKGROUND

A function of providing a slide show of images is provided by various types of device, such as a personal computer (PC), a TV, a smartphone, and the like. However, it may be complicated to prepare for playing content, provided by a device, using another device. Additionally, after a slide show has started, it may be difficult to effectively change content related to a slide show while the slide show is being executed.

Accordingly, there is a demand for a technology for establishing an environment for effectively playing content of a device through a slide show using at least another device and editing content related to a slide show while the slide show is being executed.

Therefore, a need exists for a system and a method of providing a slide show by using a plurality of metadata groups that are provided by a device to an external device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a slide show-providing system and method by which a slide show may be played by using metadata regarding images and music for the slide show.

In accordance with an aspect of the present disclosure, a method of providing metadata for a slide show to an external device, which is performed by a device is provided. The method includes determining a plurality of images and at least one piece of music for the slide show, generating metadata regarding playing of the plurality of images and the at least one piece of music, and transmitting the generated metadata to the external device. The metadata includes information regarding a playing rule for playing the plurality of images and the at least one piece of music together. The metadata is used by the external device to play the slide show.

In accordance with another aspect of the present disclosure, a device for providing metadata for a slide show to an external device is provided. The device includes a controller configured to determine a plurality of images and at least one piece of music for the slide show, and to generate metadata regarding playing of the plurality of images and the at least one piece of music, and a communication unit configured to transmit the generated metadata to the external device. The metadata includes information regarding a playing rule for playing the plurality of images and the at least one piece of music together. The metadata is used by the external device to play the slide show.

In accordance with another aspect of the present disclosure, a method of playing a slide show, which is performed by a device is provided. The method includes receiving metadata regarding playing of a plurality of images and at least one piece of music from another device, and starting the slide show, as the metadata is received. The metadata includes information regarding a playing rule for playing the plurality of images and the at least one piece of music together.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 is a diagram illustrating a method of metadata regarding an image included in an image group according to an embodiment of the present disclosure;

FIG. 11 is a diagram illustrating a method of metadata regarding modifying of an image group according to an embodiment of the present disclosure;

Throughout the drawings, it should be noted that like reference numbers are used to depict the same or similar elements, features, and structures.

DETAILED DESCRIPTION

Figure 1:
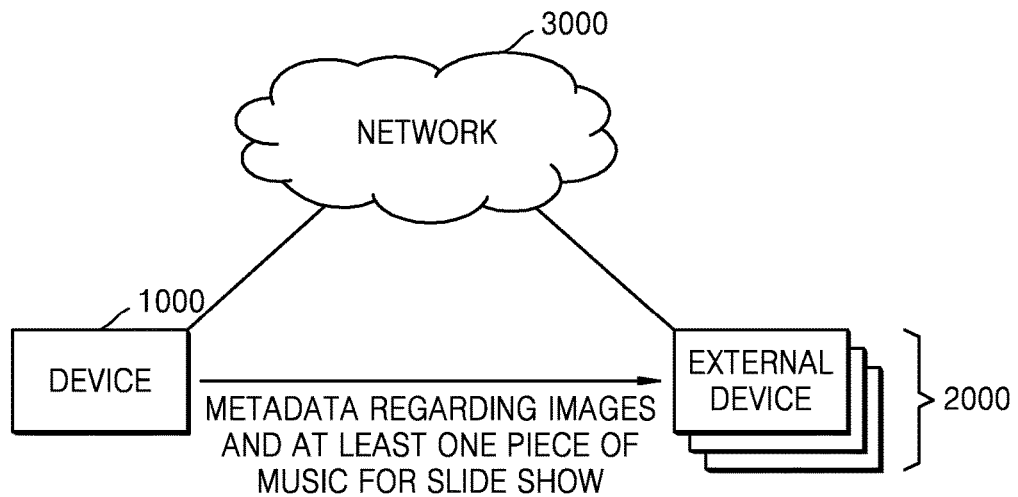
FIG. 1 is a diagram of a system for providing a slide show according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Embodiments of the present disclosure will now be described more fully with reference to the accompanying drawings, in which various embodiments of the present disclosure are shown. Embodiments of the present disclosure may, however, be embodied in many different forms and should not be construed as being limited to the embodiments set forth herein. In the description of embodiments of the present disclosure, certain detailed explanations of the related art are omitted when it is deemed that they may unnecessarily obscure the essence of the present disclosure. Like numbers refer to like elements throughout the description of the figures.

It will be understood that when an element is referred to as being "connected to" or "coupled to" another element, it may be "directly connected or coupled" to the other element, or "electrically connected to" the other element with intervening elements therebetween. It will be further understood that the terms "comprises", "comprising", "includes", and/or "including" when used herein, specify the presence of components, but do not preclude the presence or addition of one or more other components, unless otherwise specified.

In the description of embodiments of the present disclosure, an album is a collection of images, and images that are classified according to a certain subject may be included in one album. An album may include images that are classified according to a certain subject, and at least one piece of music.

An image group is a collection of images, which is generated by grouping images included in an album. A user may generate a plurality of image groups for a slide show, by grouping images included in an album.

A metadata group is a collection of metadata regarding images included in an image group. A plurality of metadata groups may be provided to an external device from a device, for a slide show of an album that includes a plurality of image groups.

Hereinafter, embodiments of the present disclosure will be described with reference to the attached drawings.

FIG. 1 is a diagram of a system for providing a slide show according to an embodiment of the present disclosure.

Referring to FIG. 1, a slide show-providing system includes a device 1000, at least one external device 2000, and a network 3000.

The device 1000 requests the external device 2000 for a slide show. The device 1000 may generate an album by selecting certain images, and request the external device 2000 for a slide show of images that belong to the album.

Additionally, the device 1000 may provide metadata for playing the images and at least one piece of music, which belong to the album. The images and the at least one piece of music, which belong to the album, may be content stored in the device 1000. However, the images and the at least one piece of music, which belong to the album, are not limited thereto, and may be content stored in a server (not illustrated). The device 1000 may generate metadata that includes link information for downloading images and at least one piece of music, which belong to the album, and information regarding a playing rule for a slide show. Additionally, the device 1000 may modify generated metadata, while the external device 2000 is playing a slide show. The device 1000 may transmit the modified metadata to the external device 2000, so that the external device 2000 may change the slide show that is being played, based on the modified metadata.

The device 1000 may generate a plurality of image groups, by grouping the images that belong to the album. Additionally, the device 1000 may transmit data for the slide show to the external device 2000 in the units of an image group. For this, the device 1000 may sequentially transmit a metadata group that corresponds to an image group to the external device 2000.

Additionally, the device 1000 may modify an image in the units of an image group. The device 1000 may modify a certain image group, while metadata groups that corresponds to image groups are being sequentially transmitted to the external device 2000.

The device 1000 may be a smartphone, a smart TV, a cellular phone, a personal digital assistant (PDA), a laptop computer, a media player, a micro-server, a global positioning system (GPS) apparatus, an e-book terminal, a digital broadcasting terminal, a navigation system, a kiosk, a moving pictures expert group audio layer 3 (MP3) player, a digital camera, or other mobile or non-mobile apparatuses, but is not limited thereto.

The external device 2000 plays a slide show. The external device 2000 may play a slide show in response to a request by the device 1000. The external device 2000 may receive metadata from the device 1000, and download images and at least one piece of music for a slide show by using the metadata. The external device 2000 may download images and at least one piece of music for a slide show from the device 1000, another device (not illustrated) of a user of the device 1000, or a server (not illustrated) of the user. Additionally, the external device 2000 may execute a slide show, by playing the downloaded images and the downloaded at least one piece of music according to a playing rule included in the metadata. The external device 2000 may receive modified metadata from the device 1000, while the slide show is being played. Additionally, the external device 2000 may change a slide show that is being played, by using the received modified metadata.

The external device 2000 may receive a metadata group in the units of an image group, and play a slide show based on the received metadata group. The external device 2000 may download, by using metadata included in the received metadata group, images and at least one piece of music for a slide show from the device 1000, another device (not illustrated) of a user of the device 1000, or a server (not illustrated) of the user.

When the external device 2000 receives a metadata group of a first image group, the external device 2000 may start a slide show. Additionally, while the slide show is being played, the external device 2000 may sequentially receive a metadata group of a second image group and a metadata group of a third image group.

Additionally, the external device 2000 may determine a playing rule of the slide show by using metadata, and play the slide show according to the determined playing rule.

The device 1000 may be a smartphone, a smart TV, a cellular phone, a PDA, a laptop computer, a media player, a micro-server, a GPS apparatus, an e-book terminal, a digital broadcasting terminal, a navigation system, a kiosk, a MP3 player, a digital camera, or other mobile or non-mobile apparatuses, but is not limited thereto. Additionally, the device 2000 may include various apparatuses that may receive a touch input, such as an electronic blackboard, a touch table, and the like.

The network 3000 may be implemented as a wired network, such as a local area network (LAN), a wide area network (WAN), a value-added network (VAN), or all types of wireless network, such as a mobile radio communication network, a satellite communication network, and the like. Additionally, the network 3000 includes a LAN, a WAN, a VAN, a mobile radio communication network, a satellite communication network, or a combination thereof. The network 3000 is a data communication network in a broad sense, which allows each subject that constitutes the network 3000, shown in FIG. 1, to smoothly communicate with each other. The network 3000 includes a wired internet, a wireless internet, or a mobile communication network. The network 3000 may also include a near field communication (NFC) network.

Figure 2:
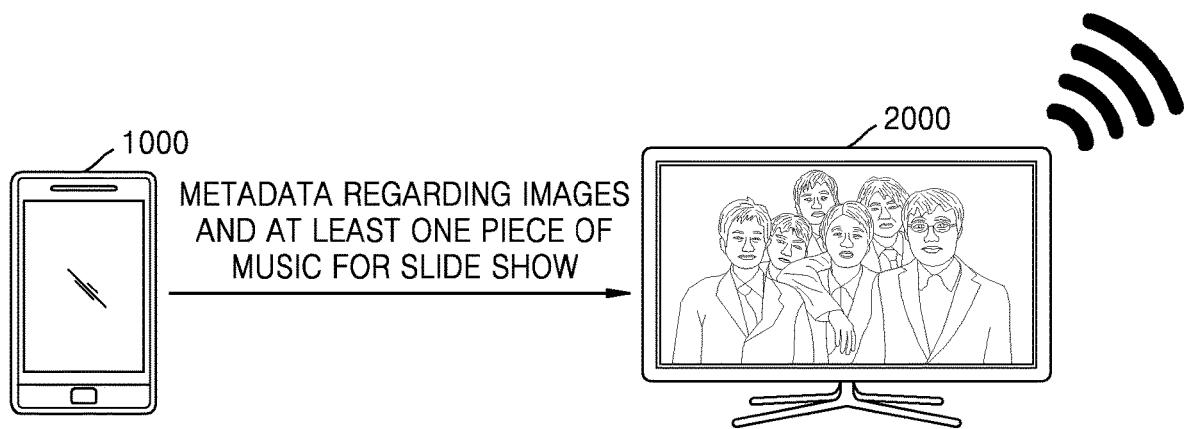
FIG. 2 is a diagram illustrating a method of transmitting a metadata group for a slide show from a device to an external device according to an embodiment of the present disclosure.

FIG. 2 is a diagram illustrating a method of transmitting a metadata group for a slide show from a device to an external device according to an embodiment of the present disclosure.

Referring to FIG. 2, the device 1000 may be a smartphone, and the external device 2000 may be a digital TV. The external device 2000 may receive metadata regarding images and at least one piece of music, which belong to an album, from the device 1000 and play a slide show by using the received metadata.

The device 1000 may sequentially transmit metadata groups of image groups that belong to the album to the external device 2000. The external device 2000 may play a slide show by using data included in a received metadata group. Additionally, for example, the metadata group may include link information for downloading images that belong to an image group, a number of the metadata group, a number of image groups for a slide show, and information regarding a playing rule for a slide show. Accordingly, the external device 2000 may play a slide show of images and music according to a playing rule, by using a metadata group that is transmitted in the units of an image group.

Figure 3:
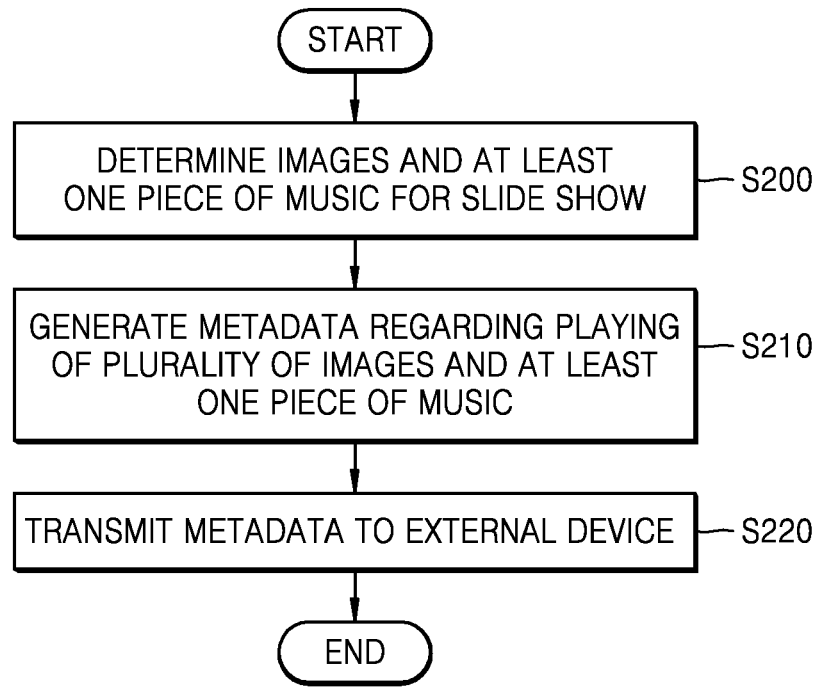
FIG. 3 is a flowchart of a method of transmitting metadata regarding a plurality of images and at least one piece of music for a slide show to an external device, which is performed by a device, according to an embodiment of the present disclosure.

FIG. 3 is a flowchart of a method of transmitting metadata regarding a plurality of images and at least one piece of music for a slide show to an external device, which is performed by a device, according to an embodiment of the present disclosure.

Referring to FIG. 3, in operation S200, the device 1000 determines images and at least one piece of music for a slide show. A certain user interface for determining images and at least one piece of music for a slide show may be displayed on a screen of the device 1000, and the device 1000 may determine images and at least one piece of music for a slide show based on a user input via the user interface. The device 1000 may select or generate an album for a slide show based on a user input. Additionally, the device 1000 may generate an album for a slide show by selecting images and at least one piece of music. The device 1000 may also directly select images and at least one piece of music for a slide show without having to select an album. As an example, an image for a slide show may include a photo image captured by using the device 1000, a photo image stored in another device (not illustrated) of a user of the device 1000, or a photo image stored in a server (not illustrated) which the user has subscribed to. Additionally, as an example, music for a slide show may include sound recorded by using the device, music stored in another device (not illustrated) of a user of the device 1000, or music stored in a server (not illustrated) which the user has subscribed to. However, an image and music for a slide show are not limited thereto.

In operation S210, the device 1000 generates metadata regarding playing of a plurality of images and at least one piece of music. Metadata may include link information for downloading the determined images and at least one piece of music and information regarding a playing rule for the slide show.

In operation S220, the device 1000 transmits the metadata to the external device 2000. While transmitting the metadata to the external device 2000, the device 1000 may request the external device 2000 to play the slide show.

Figure 4:
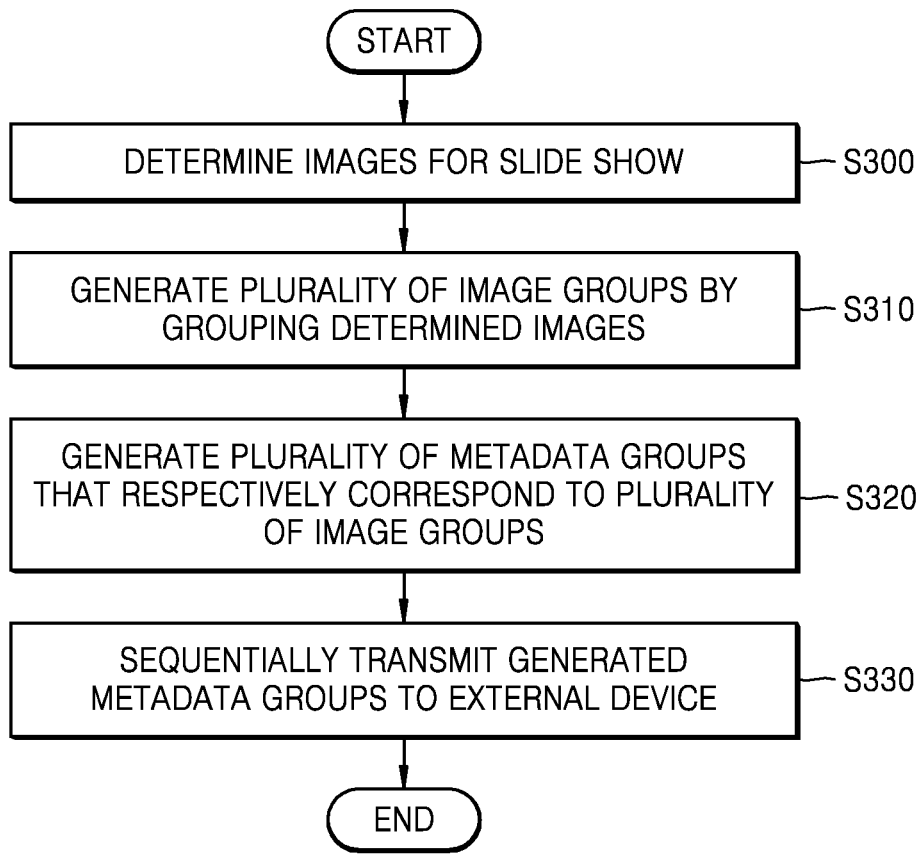
FIG. 4 is a flowchart of a method of transmitting a plurality of metadata groups for a slide show, which is performed by a device, according to an embodiment of the present disclosure.

FIG. 4 is a flowchart of a method of transmitting a plurality of metadata groups for a slide show, which is performed by a device, according to an embodiment of the present disclosure.

Referring to FIG. 4, in operation S300, the device 1000 determines images for a slide show. A certain user interface for determining images for a slide show may be displayed on a screen of the device 1000, and the device 1000 may determine images for a slide show based on a user input via the user interface. The device 1000 may select or generate an album for a slide show based on a user input. Additionally, the device 1000 may generate an album for a slide show by selecting images. The device 1000 may also directly select images for a slide show without having to select an album. For example, an image for a slide show may include a photo image captured by using the device 1000, a photo image stored in another device (not illustrated) of a user of the device 1000, or a photo image stored in a server (not illustrated) which the user has subscribed to. However, an image for a slide show is not limited thereto.

In operation S310, the device 1000 generates a plurality of image groups by grouping the determined images. The device 1000 may divide the determined images into a plurality of image groups.

The device 1000 may generate a plurality of image groups according to a preset number of image groups. For example, the device 1000 may generate 5 image groups by dividing 50 images in an album 'A' into 10 units. Alternately, the device 1000 may generate a plurality of image groups based on a preset file size. For example, if a whole file size of images in an album 'A' amounts to 50 MB, the device 1000 may generate image groups by grouping images in the units of 10 MB. However, embodiments of the present disclosure are not limited thereto, and various criteria may be set by a user so as to generate an image group. For example, images may be grouped, based on a date at which an image is captured, a location in which an image is captured, or a time at which an image is captured. Alternately, the device 1000 may group the determined images based on a user input.

Additionally, the device 1000 may determine an order and a time of playing images in the image group. For example, the device 1000 may determine an order and a time of playing images in the image group, according to a date at which an image is captured, a location in which an image is captured, a time at which an image is captured, or a size of a captured image. Alternately, the device 1000 may determine an order and a time of playing images in the image group, based on a user input.

In operation S320, the device 1000 may generate a plurality of metadata groups that respectively correspond to the plurality of image groups. For example, if 5 images groups for a slide show are present, the device 1000 may generate 5 metadata groups. Additionally, the metadata group may include data regarding link information for downloading images that belong to the image group, link information for downloading music to be played with images that belong to the image group, a number of the metadata group, a number of image groups for a slide show, a total number of the images groups for a slide show, or a playing rule of a slide show. However, embodiments of the present disclosure are not limited thereto.

In operation S330, the device 1000 sequentially transmits the generated metadata groups to the external device 2000. The device 1000 may transmit the metadata groups to the external device 2000 according to a preset order. Additionally, while the device 1000 is transmitting a first metadata group to the external device 2000, the device 1000 may request the external device 2000 to play the slide show.

Figure 5:
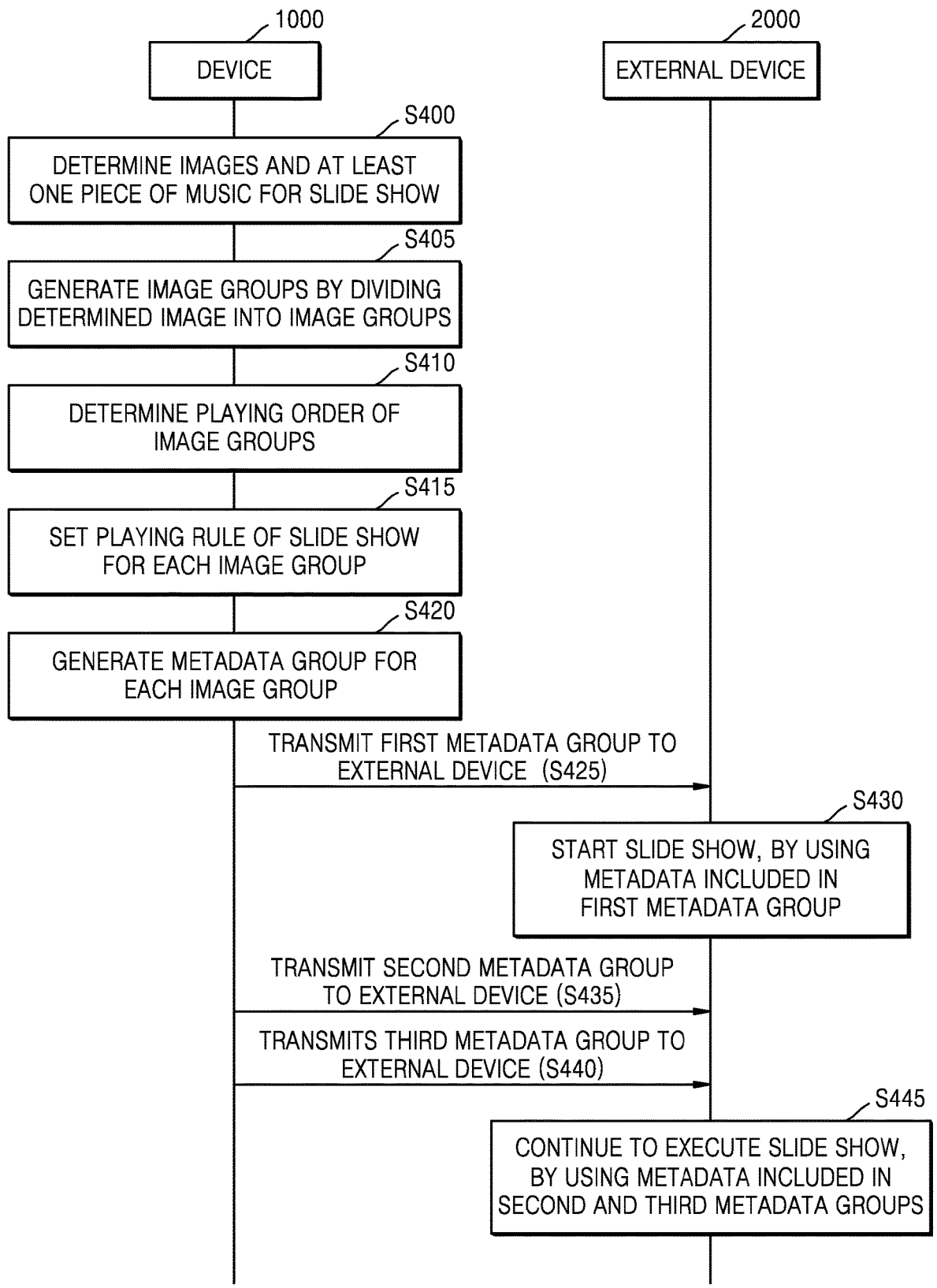
FIG. 5 is a flowchart of a method of transmitting a plurality of metadata groups for a slide show to an external device, which is performed by a device, according to an embodiment of the present disclosure.

FIG. 5 is a flowchart of a method of transmitting a plurality of metadata groups for a slide show to an external device, which is performed by a device, according to an embodiment of the present disclosure.

Referring to FIG. 5, in operation S400, the device 1000 determines images and at least one piece of music for a slide show. A certain user interface for determining images and at least one piece of music for a slide show may be displayed on a screen of the device 1000, and the device 1000 may determine images and at least one piece of music for a slide show based on a user input via the user interface. Additionally, the device 1000 may select or generate an album for a slide show based on a user input. Additionally, the device 1000 may generate an album for a slide show by selecting images and at least one piece of music. The device 1000 may also directly select images and at least one piece of music for a slide show without having to select an album. As an example, an image for a slide show may include a photo image captured by using the device 1000, a photo image stored in another device (not illustrated) of a user of the device 1000, or a photo image stored in a server (not illustrated) which the user has subscribed to. Additionally, as an example, music for a slide show may include sound stored in the device 1000, music stored in another device (not illustrated) of a user of the device 1000, or music stored in a server (not illustrated) which the user has subscribed to.

In operation S405, the device 1000 may generates image groups by dividing the determined images into the image groups. The device 1000 may generate a plurality of image groups based on a preset number of image groups. For example, the device 1000 may generate 5 image groups by dividing 50 images in an album 'A' into 10 units. Alternately, the device 1000 may generate a plurality of image groups based on a preset file size. For example, if a whole file size of images in an album 'A' amounts to 50 MB, the device 1000 may generate image groups by grouping images in the units of 10 MB. However, embodiments of the present disclosure are not limited thereto, and various criteria may be set by a user so as to generate an image group. For example, images may be grouped, based on a date at which an image is captured, a location in which an image is captured, or a time at which an image is captured. Alternately, the device 1000 may group the determined images based on a user input.

In operation S410, the device 1000 may determine a playing order of the image groups. The device 1000 may determine a playing order of the image groups, based on a user input. However, embodiments of the present disclosure are not limited thereto, and the device 1000 may determine a playing order of the image groups according to preset criteria. For example, the device 1000 may determine a playing order of image groups, according to a date at which images included in an image group were captured, a location in which images included in an image group were captured, a time at which images included in an image group were captured, or a size of captured images included in an image group.

In operation S415, the device 1000 sets a playing rule of a slide show for each image group. The device 1000 may determine an order and a time of playing images in the image group. For example, the device 1000 may determine an order and a time of playing images in the image group, according to a date at which an image is captured, a location in which an image is captured, a time at which an image is captured, or a size of a captured image. However, embodiments of the present disclosure are not limited thereto, and the device 1000 may determine an order and a time of playing images in the image group, based on a user input.

Additionally, the device 1000 may determine an order and a time of playing at least one piece of music to be played together with images in the image group. The 1000 may determine an order and a time of playing at least one piece of music based on preset criteria or a user input.

In operation S420, the device 1000 generates a metadata group for each image group. The device 1000 generates a metadata group that includes metadata for playing images in the image group and at least one piece of music. A metadata group may include metadata for playing an image, metadata for playing music, or metadata regarding a playing rule of a slide show. For example, a metadata group may include data regarding an identification value of an image, a link address for downloading an image, an order of playing an image, a time of playing an image, an identification value of music, a link address for downloading music, a point of time for starting to play music, an order of playing music, a period of time for playing music, and an order of playing an image group.

In operation S425, the device 1000 transmits a first metadata group to the external device 2000. The first metadata group may be a metadata group of a first image group that has a highest priority in a playing order.

In operation S430, the external device 2000 stars a slide show, by using metadata included in the first metadata group. As receiving of the first metadata group is finished, the external device 1000 may start a slide show. The external device 2000 may download images and at least one piece of music in the first image group, by using the metadata included in the first metadata group. Additionally, the external device 2000 may determine a playing rule of the images and the at least one piece of music in the first image group, by using the metadata included in the first metadata group. Additionally, the external device 2000 may play the images and the at least one piece of music in the first image group, according to the determined playing rule.

In operation S435, the device 1000 transmits a second metadata group to the external device 2000. The second metadata group may be a metadata group of a second image group that has a second highest priority in a playing order. While the external device 2000 is playing a slide show, the device 1000 may transmit the second metadata group to the external device 2000.

In operation S440, the device 1000 transmits a third metadata group to the external device 2000. The third metadata group may be a metadata group of a third image group that has a third highest priority in a playing order. While the external device 2000 is playing a slide show, the device 1000 may transmit the third metadata group to the external device 2000.

In operation S445, the external device 2000 continues to execute the slide show, by using metadata included in the second and third metadata groups. As playing of images that belong to the first image group is finished, a slide show may continue to be executed by using the second metadata group of the second image group. Additionally, as playing of images that belong to the second image group is finished, the slide show may continue to be executed by using the third metadata group of the third image group.

Figure 6:
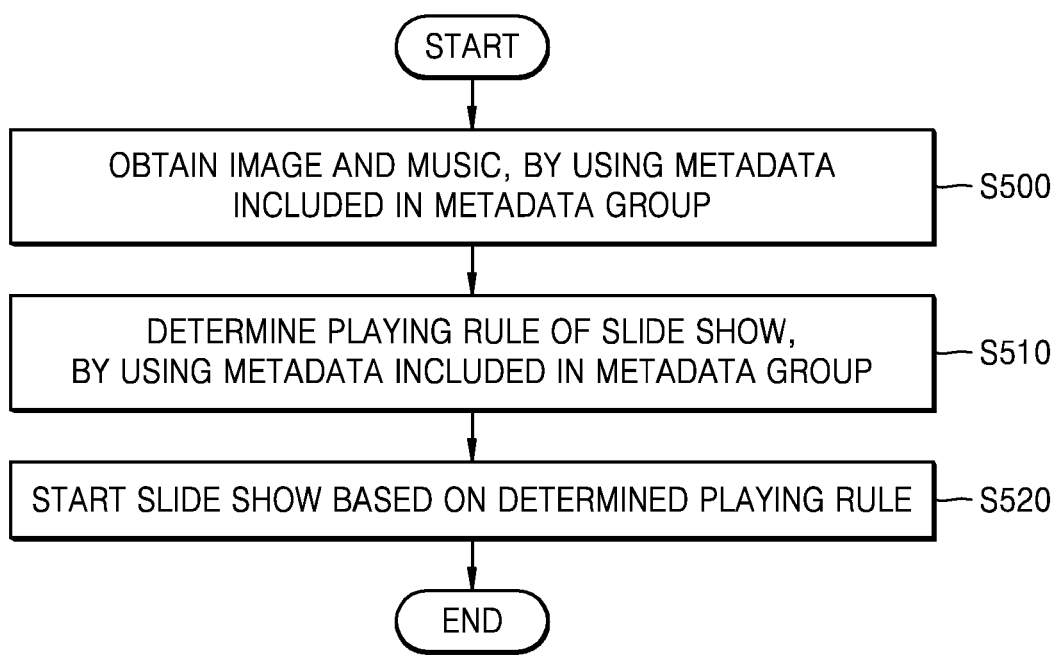
FIG. 6 is a flowchart of a method of starting a slide show, which is performed by an external device, according to an embodiment of the present disclosure.

FIG. 6 is a flowchart of a method of starting a slide show, which is performed by an external device, according to an embodiment of the present disclosure.

Referring to FIG. 6, in operation S500, the external device 2000 obtains an image and music, by using metadata included in a metadata group. The external device 2000 may extract a link address for downloading an image and a link address for downloading music from the metadata group. Additionally, the external device 2000 may obtain an image and music from at least one from among the device 1000, another device (not illustrated) of a user of the device 1000, and a server (not illustrated) of the user, by using the extracted link address. Additionally, the external device 2000 may obtain an image and music from a memory in the external device 2000, by using the extracted link address.

In operation S510, the external device 2000 determines a playing rule of a slide show, by using the metadata included in the metadata group. The external device 2000 may determine, for example, an order of playing image groups, an order of playing images in an image group, an order of playing images in an image group, a period of time for playing images in an image group, a point of time for starting to play music in an image group, a period of time for playing music in an image group, and an order of playing music in an image group.

A playing rule of a slide show may be set for each image group. In this case, the external device 2000 may determine a playing rule of a first image group based on a playing rule included in a first metadata group, determine a playing rule of a second image group based on a playing rule included in a second metadata group, and determine a playing rule of a third image group based on a playing rule included in a third metadata group.

A playing rule that is common to image groups may be included in the first metadata group, and accordingly, the playing rule that is common to the image groups may be first transmitted from the device 1000 to the external device 2000.

In operation S510, it was described that a playing rule of a slide show is determined by using the metadata in the metadata group, but embodiments of the present disclosure are not limited thereto. The external device 2000 may determine a playing rule of the slide show, based on preset criteria or a user input. In this case, a user interface for setting a playing rule of the slide show may be displayed on a screen of the external device 2000.

In operation S520, the external device 2000 starts the slide show based on the determined playing rule. The external device 2000 may sequentially play images in the image group according to the playing order. Additionally, the external device 2000 may play music in the image group at a certain point of playing time. Additionally, after the external device 2000 plays all images in a certain image group, the external device 2000 may play images in an image group in a next order.

Figure 7:
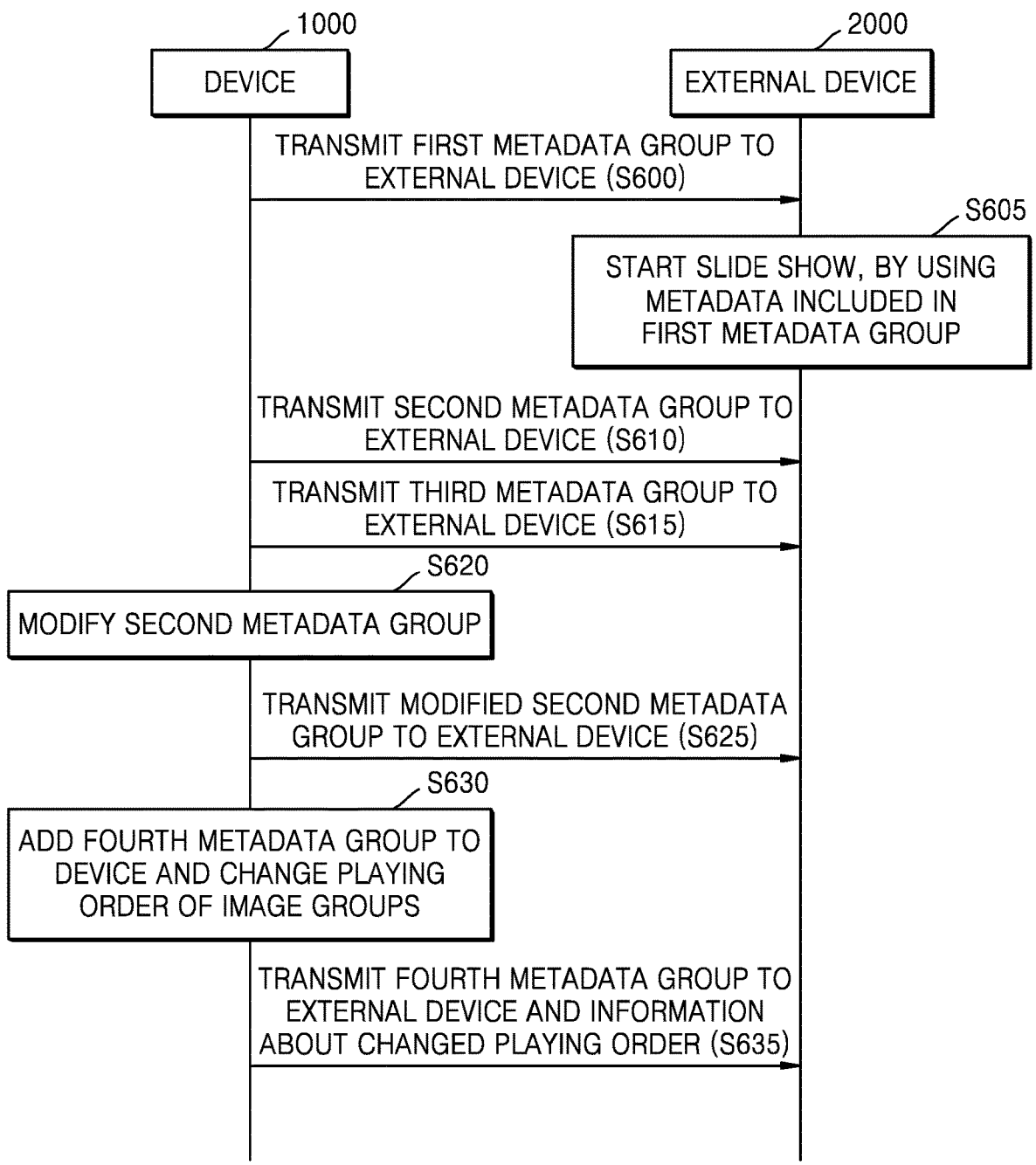
FIG. 7 is a flowchart of a method of modifying a metadata group, which is performed by a device, according to an embodiment of the present disclosure.

FIG. 7 is a flowchart of a method of modifying a metadata group, which is performed by a device according to an embodiment of the present disclosure.

Referring to FIG. 7, the device 1000 may selectively modify an image group, and a modified metadata group regarding the modified image group may be transmitted to the external device 2000.

In operation S600, the device 1000 transmits a first metadata group to the external device 2000, and the external device 2000 starts a slide show by using metadata included in a first metadata group in operation S605.

In operation S610, the device 1000 transmits a second metadata group to the external device 2000. In operation S615, the device 1000 transmits a third metadata group to the external device 2000.

In operation S620, the device 1000 modifies a second metadata group. The device 1000 may modify the second group, by modifying a second image group that corresponds to the second metadata group. For example, the device 1000 may delete or change a whole or part of images included in the second image group. Additionally, for example, the device 1000 may add a new image to the second image group. Additionally, for example, the device may delete or change music included in the second image group. Additionally, for example, the device 1000 may add new music to the second image group. Additionally, for example, the device 1000 may change an order or a time for playing image in the second image group. Additionally, for example, the device may change a point of time, an order, and a period of time of playing music in the second image group. Additionally, as the second image group is changed, the device 1000 may modify the second metadata group.

In operation S625, the device 1000 transmits the modified second metadata group to the external device 2000. The device 1000 may transmit whole metadata included in the modified second metadata group, but embodiments of the present disclosure are not limited thereto. The device 1000 may transmit data regarding modifying of an image group, from among metadata included in the modified second metadata group.

In operation S630, the device 1000 adds a fourth metadata group and changes an order of playing image groups. The device 1000 may add a fourth image group that is a new image group, and generate a fourth metadata group regarding images in the fourth image group. The fourth metadata group may include data for playing image included in the fourth image group. Additionally, the device 100 may add the fourth metadata group to metadata groups.

Additionally, the device 1000 may change an order of playing image groups. For example, the device 1000 may change an order of playing image groups, so that image groups may be played in an order of the first image group, the third image group, the fourth image group, and the second image group.

In operation S635, the device 1000 transmits the fourth metadata group and information about the changed playing order. Accordingly, the external device 2000 may download images and music that are included in the fourth image group, and execute a slide show based on information about the changed playing order.

Figure 8:
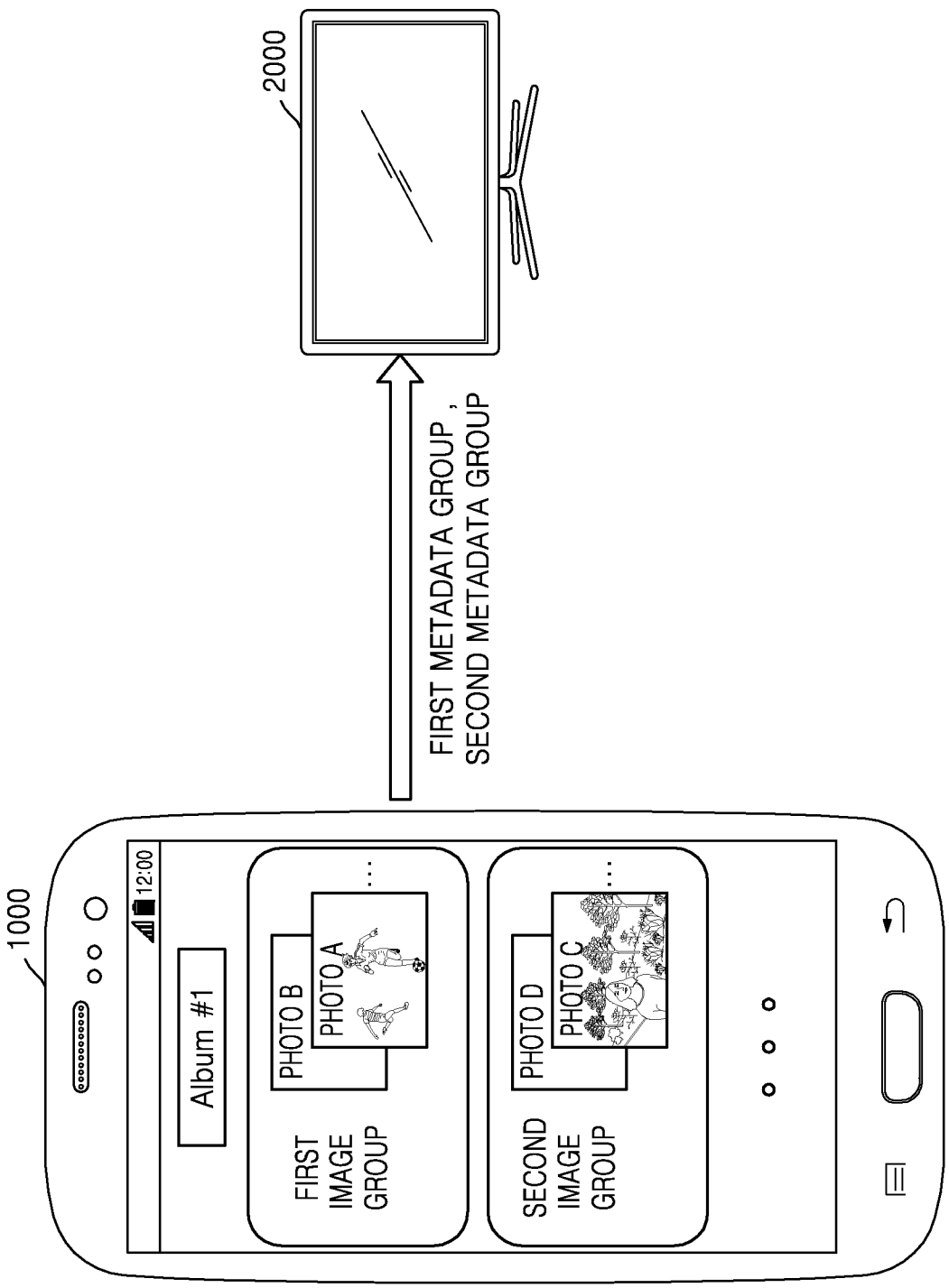
FIG. 8 is a diagram illustrating a method of a metadata group that corresponds to an image group included in an album according to an embodiment of the present disclosure.

FIG. 8 is a diagram illustrating a method of a metadata group that corresponds to an image group included in an album according to an embodiment of the present disclosure.

Referring to FIG. 8, an album #1 may include a plurality of images. Additionally, as the plurality of images are divided into image groups, the album #1 may include a first image group and a second image group. Additionally, a first metadata group that corresponds to the first image group may include data for playing images that belong to the first image group. Additionally, a second metadata group that corresponds to the second image group may include data for playing images that belong to the second image group. Additionally, the device 1000 may sequentially transmit the first metadata group and the second metadata group to the external device 2000.

Figure 9:
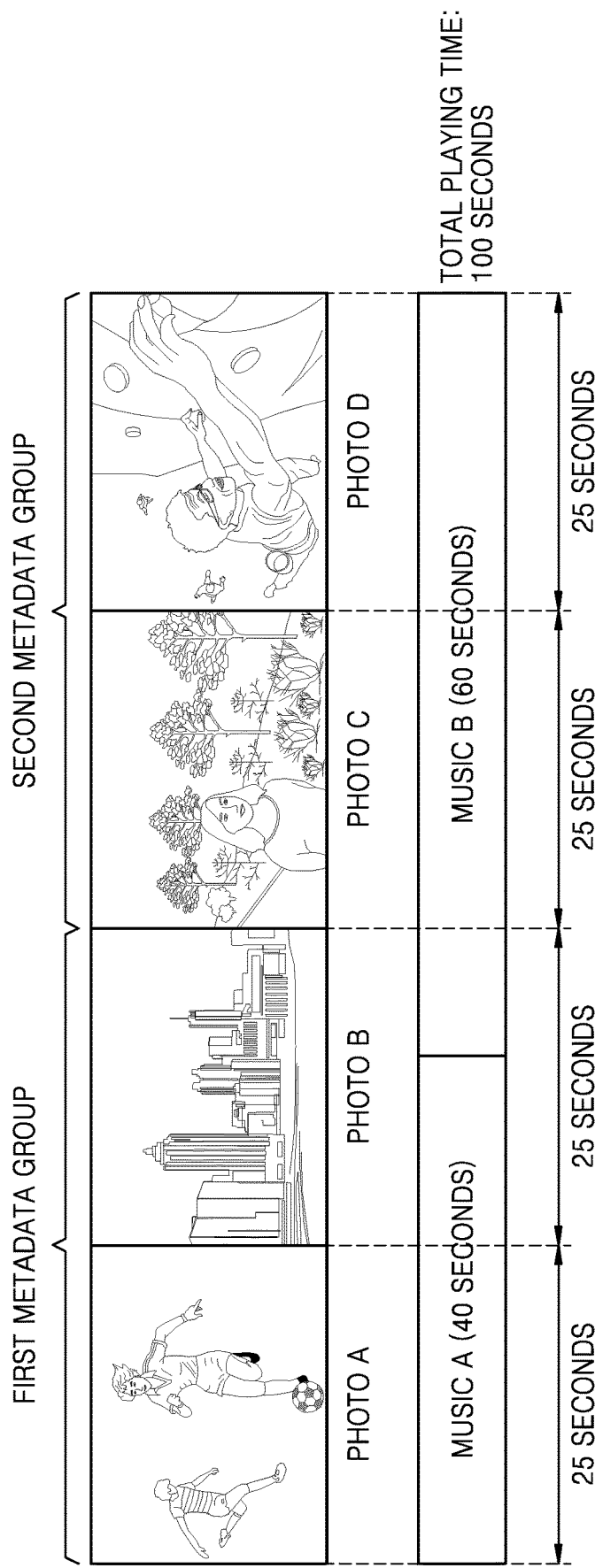
FIG. 9 is a diagram illustrating a playing rule of a slide show according to an embodiment of the present disclosure.

FIG. 9 is a diagram illustrating a playing rule of a slide show according to an embodiment of the present disclosure.

Referring to FIG. 9, an order and a time for playing photo images for a slide show may be determined, and music to be played together with the photo images, a point of time for playing music, and an order of playing music may be determined.

For example, photo images may be played in an order of a photo A, a photo B, a photo C, and a photo D. Additionally, the photos A, B, C, and D may be respectively played for 25 seconds. Additionally, when the photo A is played, music A may start to be played and may be played for 40 seconds. Additionally, while a photo B is being played, the playing of the music A may be finished, and music B may be played. The music B may be played for 60 seconds.

Additionally, the photos A and B and the music A and B are included in a first image group, and information about a playing rule for a slide show of the photos A and B may be included in a first metadata group. Additionally, the photos C and D and music B are included in a second image group, and information about a playing rule for a slide show of the photos C and D may be included in a second metadata group.

FIG. 10 is a diagram illustrating a method of metadata regarding an image included in an image group according to an embodiment of the present disclosure.

Referring to FIG. 10, 'playlist version' may represent a version of an image group, and 'album' may represent an identification value of an album, which is a key value of a slide show. Additionally, 'totalpage' may represent a total number of image groups in an album, and 'currentpage' may represent a number of an image group.

Additionally, 'item' may represent an identification value of an image that belongs to an image group, and 'size' may represent a size of an image that belongs to the image group. For example, 'date' may represent a date at which an image that belongs to the image group was captured, and 'uri' may represent an address for downloading an image that belongs to the image group.

FIG. 11 is a diagram illustrating a method of metadata regarding editing of an image group according to an embodiment of the present disclosure.

Referring to FIG. 11, 'playlist version', 'album', 'totalpage', 'currentpage', which are values for identifying metadata that is to be modified, may be written. For example, 'playlist version' may represent a version of an image group, and 'album' may represent an identification value of an album, which is a key value of a slide show. Additionally, 'totalpage' may represent a total number of image groups in an album, and 'currentpage' may represent a number of an image group.

For example, 'update' may represent how to modify an image in an image group. For example, 'add' and 'remove' may be written as a value of 'update'. If 'add' is written as a value of 'update', images included in itemList may be added to the image group. Additionally, if 'remove' is written as a value of 'update', images included in items of itemList may be deleted from an image group.

Figures 12, 13:
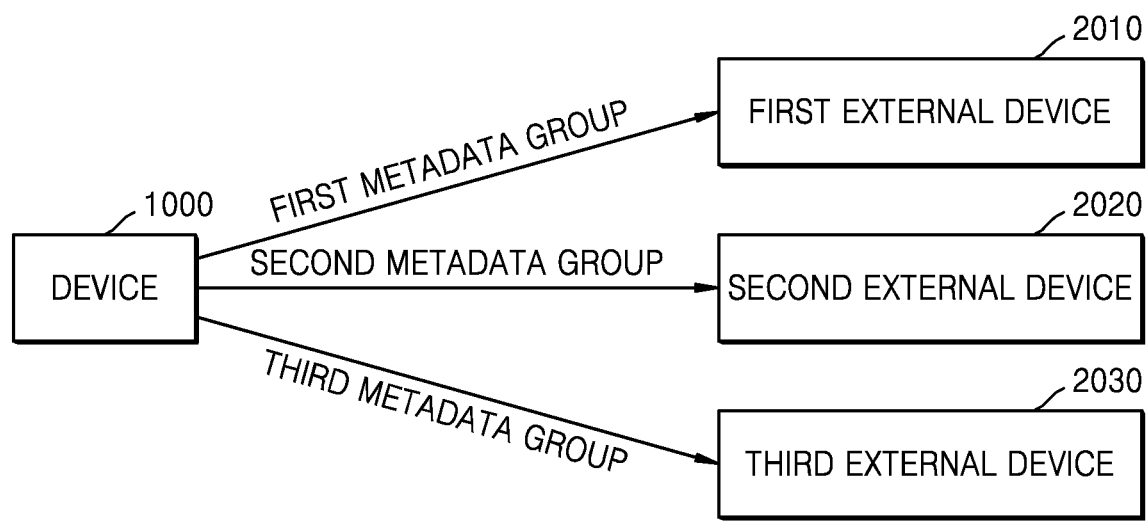
FIG. 12 is a diagram illustrating a method of metadata regarding music included in an image group according to an embodiment of the present disclosure.
FIG. 13 is a diagram illustrating a method of transmitting a plurality of metadata groups to a plurality of external devices, which is performed by a device, according to an embodiment of the present disclosure.

FIG. 12 is a diagram illustrating a method of metadata regarding music included in an image group according to an embodiment of the present disclosure.

Referring to FIG. 12, with regard to metadata regarding music to be played in a slide show, 'title' may represent a title of music, and 'album' may represent a name of an album of music to be played. For example, 'artist' may represent an artist of music to be played, and 'url' may represent a value of a link address at which music to be played may be downloaded.

Metadata shown in at least one from among FIGS. 10 through 12 may be included in a metadata group, but is not limited thereto. The metadata shown in at least one from among FIGS. 10 through 12 is an example, and various types of information may be included in a metadata group in various formats, so as to play and modify an image and music which belong to an image group.

FIG. 13 is a diagram illustrating a method of transmitting a plurality of metadata groups to a plurality of external devices, which is performed by a device according to an embodiment of the present disclosure.

Referring to FIG. 13, the device 1000 may transmit a metadata group for playing images to the external device 2000 for each image group. For example, the device 1000 may transmit a first metadata group regarding images in a first image group to a first external device 2010, transmit a second metadata group regarding images in a second image group to a second external device 2020, and transmit a third metadata group regarding images in a third image group to a third external device 2030. Accordingly, the first external device 2010 may play images in the first image group, the second external device 2020 may play images in the second image group, and the third external device 2030 may play images in the third image group.

However, embodiments of the present disclosure are not limited thereto, and the device 1000 may also transmit metadata groups for playing images to the external device 2000 according to each album.

Figure 14:
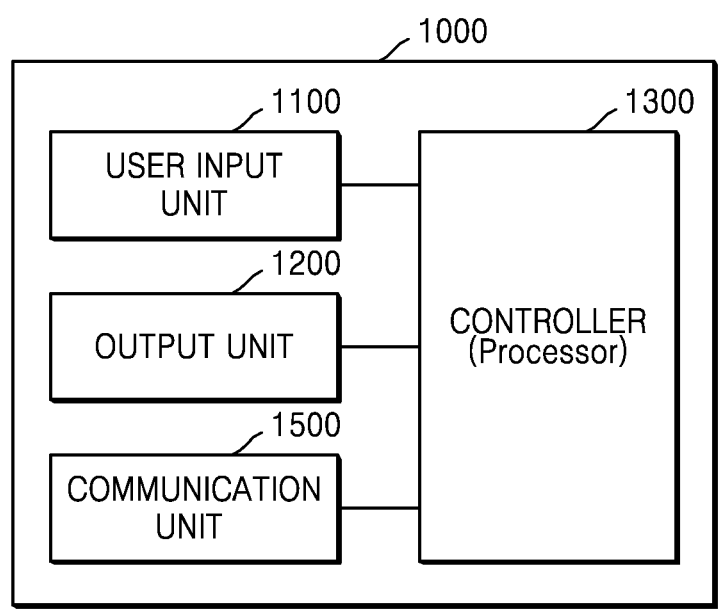
FIGS. 14 and 15 are block diagrams illustrating a configuration of a device according to an embodiment of the present disclosure.
Figure 15:
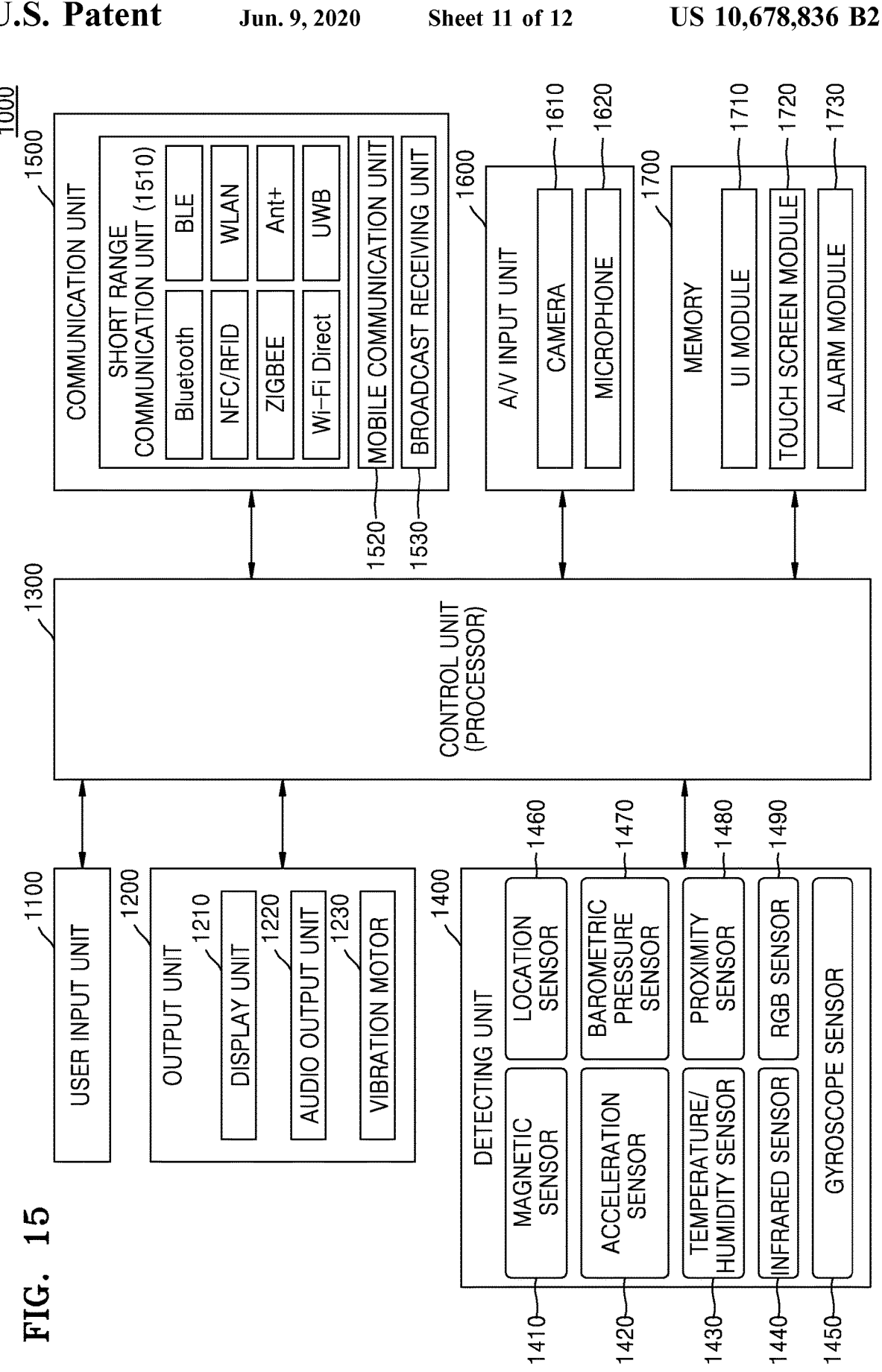

FIGS. 14 and 15 are block diagrams illustrating a configuration of a device according to an embodiment of the present disclosure.

Referring to FIG. 14, the device 1000 may include a user input unit 1100, an output unit 1200, a controller 1300, and a communication unit 1500. However, the units shown in FIG. 14 are not always essential units. The device 1000 may be implemented by using more or less units than those shown in FIG. 14.

Referring to FIG. 15, the device 1000 may include a detecting unit 1400, an audio-video (A/V) input unit 1600, and a memory 1700, in addition to the user input unit 1100, the output unit 1200, the controller 1300, and the communication unit 1500.

Hereinafter, the units are sequentially described.

The user input unit 1100 is a unit for inputting data so that a user may control the device 1000. For example, the user input unit 1100 may include a key pad, a dome switch, a touch pad, which may be a capacitive overlay type, a resistive overlay type, an infrared beam type, a surface acoustic wave type, an integral strain gauge type, or a piezo electric type, a jog wheel, or a jog switch, but is not limited thereto.

The user input unit 1100 may receive a user input. For example, the user input unit 1100 may receive a user input for selecting images and at least one piece of music for a slide show, a user input for generating an album, a user input for generating an image group, a user input for generating a metadata group, a user input for modifying an image group, or a user input for transmitting a metadata group to the external device 2000.

The output unit 1200 functions to output an audio signal, a video signal, or a vibration signal, and may include a display unit 1210, an audio output unit 1220, and a vibration motor 1230.

The display unit 1210 displays and outputs information that is processed by the device 1000. For example, the device 1000 may display a user interface for selecting images for a slide show, a user interface for generating an album, a user interface for generating an image group, a user interface for generating a metadata group, a user interface for modifying an image group, or a user interface for transmitting a metadata group to the external device 2000.

If the display unit 1210 and a touch pad form a layered structure to constitute a touch screen, the display unit 1210 may be also used as an input device as well as an output unit. The display unit 1210 may include at least one from among a liquid crystal display (LCD), a thin-film transistor-liquid crystal display (TFT-LCD), an organic light-emitting diode (OLED), a flexible display, a 3-dimensional (3D) display, and an electrophoretic display. According to an implementation type of the device 1000, the first device 100 may include two or more display units 1210. The two or more display units 1210 may be disposed to face each other by using a hinge.

The audio output unit 1220 outputs audio data which is received from the communication unit 1500 or stored in the memory 1700. The audio output unit 1220 outputs an audio signal related to functions performed by the device 1000, for example, a call signal reception sound, a message reception sound, or an alarm sound. The sound output unit 1220 may include a speaker, a buzzer, and so on.

The vibration motor 1230 may output a vibration signal. For example, the vibration motor 1230 may output a vibration signal which corresponds to an output of audio data or video data, for example, a call signal reception sound, a message reception sound, and the like. Additionally, the vibration motor 1230 may output a vibration signal if a touch is input to a touch screen.

The controller 1300 generally controls all operations of the device 1000. For example, the controller 1300 may control the user input unit 1100, the output unit 1200, the detecting unit 1400, the communication unit 1500, and the A/V input unit 1600 by executing programs stored in the memory 1700.

More particularly, the controller 1300 determines images and at least one piece of music for a slide show. A certain user interface for determining images and at least one piece of music for a slide show may be displayed on a screen of the device 1000, and the controller 1300 may determine images and at least one piece of music for a slide show based on a user input via the user interface. The controller 1300 may select or generate an album for a slide show based on a user input. The controller 1300 may generate an album for a slide show by selecting images and at least one piece of music. The controller 1300 may also directly select images and at least one piece of music for a slide show without having to select an album. As an example, an image for a slide show may include a photo image captured by using the device 1000, a photo image stored in another device (not illustrated) of a user of the device 1000, or a photo image stored in a server (not illustrated) which the user has subscribed to. Additionally, as an example, music for a slide show may include sound recorded by using the device 1000, music stored in another device (not illustrated) of a user of the device 1000, or music stored in a server (not illustrated) which the user has subscribed to. However, an image and music for a slide show are not limited thereto.

The controller 1300 generates metadata regarding playing of a plurality of images and at least one piece of music. Metadata may include link information for downloading the determined images and at least one piece of music and information regarding a playing rule for the slide show.

The controller 1300 transmits the metadata to the external device 2000. While transmitting the metadata to the external device 2000, the device 1000 may request the external device 2000 to play the slide show.

Additionally, while the external device 2000 plays a slide show, the controller 1300 may modify generated metadata. The controller 1300 may transmit the modified metadata to the external device 2000, so that the external device 2000 may change the slide show that is being played, based on the modified metadata.

The controller 1300 may generate a plurality of image groups by grouping the determined images. The controller 1300 may divide the determined images into a plurality of image groups. The controller 1300 may generate a plurality of image groups based on a preset number of image groups. For example, the controller 1300 may generate 5 image groups by dividing 50 images in an album 'A' into 10 units. Alternately, the controller 1300 may generate a plurality of image groups based on a preset file size. For example, if a whole file size of images in an album 'A' amounts to 50 MB, the controller 1300 may generate image groups by grouping images in the units of 10 MB. However, embodiments of the present disclosure are not limited thereto, and various criteria may be set by a user so as to generate an image group. For example, images may be grouped, based on a date at which an image is captured, a location in which an image is captured, or a time at which an image is captured. Alternately, the controller 1300 may group the determined images based on a user input.

The controller 1300 may determine an order of playing image groups in the image group. The controller 1300 may determine an order of playing image groups based on a user input. However, embodiments of the present disclosure are not limited thereto, and the controller 1300 may determine an order of playing image groups according to preset criteria. For example, the controller 1300 may determine an order of playing image groups, according to a date at which images included in an image group were captured, a location in which images included in an image group were captured, a time at which images included in an image group were captured, or a size of captured images included in an image group.

The controller 1300 may set a playing rule of a slide show for each image group. The controller 1300 may determine an order and a time of playing images in the image group. For example, the controller 1300 may determine an order and a time of playing images in the image group, according to a date at which an image is captured, a location in which an image is captured, a time at which an image is captured, or a size of a captured image. However, embodiments of the present disclosure are not limited thereto, and the controller 1300 may determine an order and a time of playing images in the image group, based on a user input.

The controller 1300 may determine an order and a time of playing at least one piece of music which is to be played with images in the image group. The controller 1300 may determine an order and a time of playing at least one piece of music based on preset criteria or a user input.

The controller 1300 generates a metadata group for each image group. The controller 1300 may generate a metadata group that includes metadata for playing images in the image group and at least one piece of music. A metadata group may include metadata for playing an image, metadata for playing music, or metadata regarding a playing rule of a slide show. For example, a metadata group may include data regarding an identification value of an image, a link address for downloading an image, an order of playing an image, a time of playing an image, an identification value of music, a link address for downloading music, a point of time for starting to play music, an order of playing music, a period of time for playing music, and an order of playing an image group.

The controller 1300 may generate a plurality of metadata groups that respectively correspond to a plurality of image groups. For example, if 5 image groups for a slide show are present, the controller 1300 may generate 5 metadata groups.

The controller 1300 sequentially transmits the metadata groups to the external device 2000, by controlling the communication unit 1500. The controller 1300 may transmit the metadata groups to the external device 2000 according to a preset order. Additionally, while the controller 1300 is transmitting a first metadata group to the external device 2000, the controller 1300 may request the external device 2000 to play the slide show.

The controller 1300 may modify a metadata group. The controller 1300 may modify a metadata group by modifying an image group that corresponds to the metadata group. For example, the controller 1300 may delete or change a whole or part of images included in a second image group. Additionally, for example, the controller 1300 may add a new image to the second image group. Additionally, for example, the controller 1300 may delete or change music included in the second image group. Additionally, for example, the controller 1300 may add new music to the second image group. Additionally, for example, the controller 1300 may change an order or a time for playing images in the second image group. Additionally, for example, the controller 1300 may change a point of time, an order, and a period of time of playing music in the second image group. Additionally, as the second image group is changed, the controller 1300 may modify the second metadata group.

The controller 1300 transmits the modified metadata group to the external device 2000, by controlling the communication unit 1500. The controller 1300 may transmit whole metadata included in the modified metadata group, but embodiments of the present disclosure are not limited thereto. The controller 1300 may transmit data regarding modifying of an image group, from among metadata included in the modified metadata group.

The controller 1300 may add a metadata group to the device 1000 and change an order of playing image groups. For example, the controller 1300 may add a fourth image group that is a new image group to the device 1000, and generate a fourth metadata group regarding images in the fourth image group. The fourth metadata group may include data for playing image included in the fourth image group. Additionally, the controller 1300 may add the fourth metadata group to metadata groups.

The controller 1300 may change an order of playing image groups. For example, the controller 1300 may change an order of playing image groups, so that image groups may be played in an order of a first image group, a third image group, a fourth image group, and a second image group.

The controller 1300 may transmit the added metadata group and information about the changed playing order to the external device 2000, by controlling the communication unit 1500. Accordingly, the external device 2000 may download images and music that are included in the fourth image group, and execute a slide show based on the information about the changed playing order.

The detecting unit 1400 may detect a status of the device 1000 or a status near the device 1000, and transmit detected information to the controller 1300.

The detecting unit 1400 may include at least one of a magnetic sensor 1410, an acceleration sensor 1420, a temperature/humidity sensor 1430, an infrared sensor 1440, a gyroscope sensor 1450, a location sensor 1460, for example, a global positioning system (GPS), a barometric pressure sensor 1470, a proximity sensor 1480, and a red-green-blue (RGB) sensor (illuminance sensor) 1490, but is not limited thereto. Functions of the respective sensors may be intuitively inferred from a name thereof by those of ordinary skill in the art. Thus, a detailed description thereof will not be provided here.

The communication unit 1500 may include one or more units for communication between the device 1000 and the external device 2000 or between the device 1000 and a server (not illustrated). For example, the communication unit 1500 may include a short-range communication unit 1510, a mobile communication unit 1520, and a broadcasting receiving unit 1530.

The short-range communication unit 1510 may include a Bluetooth communication unit, a BLE communication unit 201, a NFC unit, a wireless local area network (WLAN) Wi-Fi communication unit, a Zigbee communication unit, an infrared data association (IrDA) communication unit, a Wi-Fi Direct (WFD) communication unit, a ultra wideband (UWB) communication unit, an Ant+ communication unit, but is not limited thereto.

The mobile communication unit 1520 transceives a wireless signal with at least one of a base station, an external terminal, and a server on a mobile communication network. The wireless signal may include a voice call signal, a video phone call signal or various forms of data used to transceive text or multimedia messages.

The broadcasting receiving unit 1530 receives broadcasting signals and/or broadcasting-related information from outside via a broadcasting channel. The broadcasting channel may be a satellite channel or a terrestrial broadcast channel. According to embodiments of the present disclosure, the device 1000 may not include a broadcasting receiving unit 1530.

The communication unit 1500 is controlled by the controller 1300 to sequentially transmit metadata groups to the external device 2000. Additionally, the communication unit 1500 is controlled by the controller 1300 to transmit a metadata group, modified by the controller 1300, to the external device 2000. The communication unit 1500 is controlled by the controller 1300 to transmit an added metadata group and information about the changed playing order to the external device 2000.

The A/V input unit 1600 functions to input audio or video signals, and may include a camera 1610 and a microphone 1620. The camera 1610 may obtain an image frame, such as a still image or a moving image through an image sensor, in a video phone mode or a photographing mode. An image captured through the image sensor may be processed through the controller 1300 or an additional image processing unit (not illustrated).

The image frame processed by the camera 1610 may be stored in the memory 1700 or transmitted to the outside through the communication unit 1500. The A/V input unit 1610 may include two or more cameras 1610 according to a configuration type of a terminal.

The microphone 1620 receives an external sound signal and processes the external sound signal into electrical voice data. For example, the microphone 1620 may receive a sound signal from an external device or a speaker. The microphone 1620 may employ various noise removal algorithms for removing noise that may be generated in a process of receiving an input of an external sound signal.

The memory 1700 may store a program for processing and controlling the controller 1300. The memory 1700 may also store data that is input or output.

The memory 1700 may include at least one type of storage medium from among a flash memory, a hard disk, a multimedia card micro, a card-type memory, such as a secure digital (SD) or extreme digital (XD) memory, a random access memory (RAM), a static random access memory (SRAM), a read-only memory (ROM), an electrically erasable programmable read-only memory (EEPROM), a programmable read-only memory (PROM), a magnetic memory, a magnetic disc, an optical disc, and the like. Additionally, the device 1000 may operate a web storage for performing a storage function of the memory 1700 on the internet.

Programs stored in the memory 1700 may be classified into a plurality of modules according to functions. For example, the programs may be classified into a user interface (UI) module 1710, a touch screen module 1720, and an alarm module 1730.

The UI module 1710 may provide a specialized UI or graphic user interface (GUI) which interworks with the device 1000 according to applications. The touch screen module 1720 may detect a touch gesture on a touch screen by a user and transmit information about the touch gesture to the controller 1300. According to an embodiment of the present disclosure, the touch screen module 1720 may recognize and analyze a touch code. The touch screen module 1720 may be formed of additional hardware that includes a controller.

Various types of sensor may be disposed inside or near the touch screen, in order to detect a touch or a proximity touch on the touch screen. An example of a sensor for detecting a touch on the touch screen may be a tactile sensor. The tactile sensor is a sensor that may detect a contact with a specific object to such a degree that humans feel a contact or to a higher degree. The tactile sensor may detect various types of information, such as information about a roughness of a contact surface, a hardness of a contact object, or a temperature at a contact point.

Additionally, an example of a sensor for detecting a touch on the touch screen is a proximity sensor.

The proximity sensor is a sensor for detecting an object which is approaching a detection surface or a neighboring object without a mechanical contact by using the strength of an electromagnetic field or an infrared light. Examples of the proximity sensor include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, and an infrared proximity sensor. Touch gestures of a user may include a tap, a touch and hold, a double-tap, a drag, panning, a flick, a drag-and-drop, and a swipe.

The alarm module 1730 may generate a signal for notifying generation of an event in the device 1000. Examples of the event generated in the device 1000 may include call signal reception, message reception, key signal input, and schedule notification. The alarm module 1730 may output an alarm signal in a form of a video signal via the display unit 1210 or in a form of an audio signal via the audio output unit 1220. The alarm module 1730 may also output an alarm signal in a form of a vibration signal via the vibration motor 1230.

Figure 16:
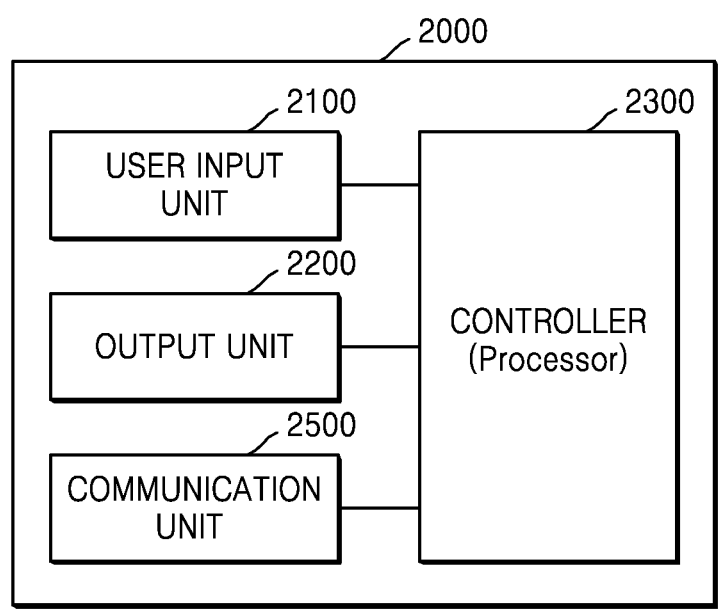
FIG. 16 is a block diagram illustrating a configuration of an external device according to an embodiment of the present disclosure.

FIG. 16 is a block diagram illustrating a configuration of an external device according to an embodiment of the present disclosure.

Referring to FIG. 16, the external device 2000 may include a user input unit 2100, an output unit 2200, a controller 2300, and a communication unit 2500. However, the units shown in FIG. 16 are not always essential units. The external device 2000 may be implemented by using more or less units than those shown in FIG. 16. For example, the external device 2000 may include the elements as shown in FIG. 14.

The user input unit 2100 is a unit for inputting data so that a user may control the device 1000. The user input unit 2100 may receive a user input.

The output unit 2200 functions to output an audio signal, a video signal, or a vibration signal. For example, the output unit 2200 may include a display unit (not illustrated), an audio output unit (not illustrated), and a vibration motor (not illustrated). The display unit (not illustrated) may sequentially display images included in an image group. Additionally, the audio output unit (not illustrated) may output music included in an image group.

The controller 2300 generally controls all operations of the external device 2000. For example, the controller 2300 may control the user input unit 2100, the output unit 2200, and the communication unit 2500, by executing programs stored in a memory.

More particularly, the controller 2300 controls the communication unit 2500 to receive metadata, which is used to play images and at least one piece of music that are determined by the external device 2000, from the device 1000. Additionally, the controller 2300 may download images and at least one piece of music for a slide show, by using the received metadata. The controller 2300 may download images and at least one piece of music for a slide show from the device 1000, another device (not illustrated) of a user of the external device 2000, or a server (not illustrated). Additionally, the controller 2300 may execute a slide show, by playing the downloaded images and the downloaded at least one piece of music according to a playing rule included in the metadata. The controller 2300 may receive modified metadata from the device 1000, while the slide show is being played. Additionally, the controller 2300 may change a slide that is being played, by using the received modified metadata.

The controller 2300 may receive a metadata group from the device 1000 by controlling the communication unit 2500. Additionally, the controller 2300 may obtain an image and music, by using metadata included in a metadata group. The controller 2300 may extract a link address for downloading an image and a link address for downloading music from the metadata group. Additionally, the controller 2300 may obtain an image and music from at least one from among the device 1000, another device (not illustrated) of a user of the device 1000, and a server (not illustrated) of the user, by using the extracted link address. Additionally, the controller 2300 may obtain an image and music from a memory in the external device 2000, by using the extracted link address.

The controller 2300 may determine a playing rule of a slide show, by using the metadata included in the metadata group. The controller 2300 may determine, for example, an order of playing image groups, an order of playing images in an image group, an order of playing images in an image group, a period of time for playing images in an image group, a point of time for starting to play music in an image group, a period of time for playing music in an image group, and an order of playing music in an image group.

A playing rule of a slide show may be set for each image group. In this case, the controller 2300 may determine a playing rule of a first image group based on a playing rule included in a first metadata group, determine a playing rule of a second image group based on a playing rule included in a second metadata group, and determine a playing rule of a third image group based on a playing rule included in a third metadata group.

A playing rule that is common to image groups may be included in the first metadata group, and accordingly, the playing rule that is common to the image groups may be first transmitted from the device 1000 to the external device 2000.

It was described that a playing rule of a slide show is determined by using the metadata in the metadata group, but embodiments of the present disclosure are not limited thereto. The controller 2300 may determine a playing rule of the slide show, based on preset criteria or a user input. In this case, a user interface for setting a playing rule of the slide show may be displayed on a screen of the external device 2000.

The controller 2300 may start the slide show based on the determined playing rule, by controlling the output unit 2200.

The controller 2300 may sequentially play images in the image group according to the playing order. Additionally, the controller 2300 may play music in the image group at a certain point of playing time. Additionally, after the controller 2300 plays all images in a certain image group, the controller 2300 may play images in an image group in a next order.

The communication unit 2500 may include one or more units for communication between the device 1000 and the external device 2000 or between the device 1000 and a server (not illustrated). For example, the communication unit 2500 may include a short-range communication unit, a mobile communication unit, and a broadcasting receiving unit.

The communication unit 2500 may be controlled by the controller 2300, to receive a metadata group from the device 1000. Additionally, the communication unit 2500 may be controlled by the controller 2300 to receive an image and music from the device 1000, another device (not illustrated) of a user of the device 1000, and a server (not illustrated) of the user.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

It should be understood that the embodiments described therein should be considered in a descriptive sense only and not for purposes of limitation. Descriptions of features or aspects within each embodiment should typically be considered as available for other similar features or aspects in other embodiments. For example, each component described in singular form may be executed in a distributed form. Similarly, components described in a distributed form may be executed in a combined form.

While the present disclosure has been described with reference to various embodiments thereof, it will be understood by those skilled in the art that various changes in form and details may be made therein without departing from the spirit and scope of the present disclosure as defined by the appended claims and their equivalents.

What is claimed is:

1. A method of a device providing metadata for a slide show to an external device, the method comprising:
   determining, by a processor of the device, a plurality of images and at least one piece of music for the slide show;
   in response to determining the plurality of images and the at least one piece of music for the slide show, generating, by the processor, a plurality of metadata groups for playing the plurality of images and the at least one piece of music, the plurality of metadata groups respectively corresponding to a plurality of image groups included in the plurality of images;
   transmitting, by the processor to the external device, a first message comprising a first metadata group among the plurality of metadata groups;
   transmitting, by the processor to the external device, a second message comprising a second metadata group among the plurality of metadata groups;
   modifying, by the processor, the second metadata group while the slide show is being played by the external device; and
   transmitting, by the processor to the external device, a third message comprising the modified second metadata group,
   wherein the slide show that is being played by the external device is changed based on the modified second metadata group,
   wherein each of the plurality of metadata groups comprises information representing playing rules for playing each of the plurality of image groups and the at least one piece of music corresponding to each of the plurality of image groups together,
   wherein a playing rule common to the plurality of image groups, among the playing rules, is included in the first metadata group,
   wherein the plurality of metadata groups are used by the external device to retrieve the plurality of images, retrieve the at least one piece of music, and play the slide show according to the playing rule,
   wherein the modified second metadata group comprises modification information to change an aspect of the slide show,
   wherein the plurality of images and the at least one piece of music are stored in the device, and
   wherein the metadata of the first, second, and third messages comprises link information for the external device to download the plurality of images and the at least one piece of music.

2. The method of claim 1, further comprising:
   grouping, by the processor, the plurality of images into the plurality of image groups;
   determining, by the processor, the at least one piece of music that corresponds to the plurality of image groups;
   generating, by the processor, the plurality of metadata groups that respectively correspond to the plurality of image groups; and
   sequentially transmitting, by the processor to the external device, the plurality of metadata groups.

3. The method of claim 2, further comprising:
   determining, by the processor, a playing order of the plurality of metadata groups; and
   transmitting, by the processor to the external device, the plurality of metadata groups according to the playing order.

4. The method of claim 3, wherein, in response to the first message being transmitted to the external device, the slide show starts at the external device based on the first metadata group.

5. The method of claim 4, further comprising, after the slide show has started, transmitting the second message to the external device.

6. The method of claim 3, further comprising:
   setting, by the processor, the playing rule for the slide show,
   wherein information about the playing rule is comprised in the first metadata group from among the plurality of metadata groups.

7. The method of claim 2, further comprising:
   setting, by the processor, the playing rule for the slide show for each image group,
   wherein information about the playing rule set for each image group is comprised in a metadata group, which corresponds to an image group that corresponds to the playing rule.

8. The method of claim 7, further comprising:
   setting the playing rule of the slide show for each image group, and
   transmitting, by the processor to the external device, the playing rule common to the plurality of image groups.

9. The method of claim 2, further comprising:
   selecting, by the processor, at least one of the plurality of metadata groups;
   modifying, by the processor, the selected at least one of the plurality of metadata groups; and
   transmitting, by the processor to the external device, information about the modifying of the selected at least one of the plurality of metadata groups.

10. The method of claim 9, further comprising, as an image comprised in an image group that corresponds to the selected at least one of the plurality of metadata groups is one of modified or deleted, or as a new image is added to the image group that corresponds to the selected at least one of the plurality of metadata groups, modifying the selected at least one of the plurality of metadata groups.

11. The method of claim 9, further comprising, as a playing order of an image group that corresponds to the selected at least one of the plurality of metadata groups is changed, modifying the selected at least one of the plurality of metadata groups.

12. A non-transitory computer-readable storage medium having stored therein program instructions, which when executed by a computer, performs the method of claim 1.

13. The method of claim 2, wherein the playing rule comprises at least one of an order of playing the plurality of image groups, an order of playing images in an image group, a period of time for playing images in the image group, a point of time for starting to play music in the image group, a period of time for playing music in the image group, or an order of playing music in the image group.

14. The method of claim 1,
wherein the first message consists of the first metadata group,
wherein the second message consists of the second metadata group, and
wherein the third message consists of the modified second metadata group.

15. A device for providing metadata for a slide show to an external device, the device comprising:
a memory storing one or more instructions; and
at least one processor configured to execute the one or more instructions to:
determine a plurality of images and at least one piece of music for the slide show, in response to determining the plurality of images and the at least one piece of music for the slide show, generate a plurality of metadata groups for playing the plurality of images and the at least one piece of music, the plurality of metadata groups respectively corresponding to a plurality of image groups included in the plurality of images, control a communication interface to transmit, to the external device, a first message comprising a first metadata group among the plurality of metadata groups, control the communication interface to transmit, to the external device, a second message comprising a second metadata group among the plurality of metadata groups, modify the second metadata group while the slide show is being played by the external device, and control the communication interface to transmit, to the external device, a third message comprising the modified second metadata group, wherein the slide show that is being played by the external device is changed based on the modified second metadata group, wherein each of the plurality of metadata groups comprises information representing playing rules for playing each of the plurality of image groups and the at least one piece of music corresponding to each of the plurality of image groups together, wherein a playing rule common to the plurality of image groups, among the playing rules, is included in the first metadata group,
wherein the plurality of metadata groups are used by the external device to retrieve the plurality of images, retrieve the at least one piece of music, and play the slide show according to the playing rule,
wherein the modified second metadata group comprises modification information to change an aspect of the slide show,
wherein the plurality of images and the at least one piece of music are stored in the device, and
wherein the metadata of the first, second, and third messages comprises link information for the external device to download the plurality of images and the at least one piece of music.

16. The device of claim 15, wherein the at least one processor is further configured to:
group the plurality of images into the plurality of image groups,
determine the at least one piece of music that corresponds to the plurality of image groups,
generate the plurality of metadata groups that respectively correspond to the plurality of image groups, and
control the communication interface to sequentially transmit, to the external device, the plurality of metadata groups.

17. The device of claim 16, wherein the at least one processor is further configured to:
determine a playing order of the plurality of metadata groups, and
control the communication interface to transmit to the external device, the plurality of metadata groups according to the playing order.

18. The device of claim 17, wherein, in response to the first message being transmitted to the external device, the slide show starts at the external device based on the first metadata group.

19. The device of claim 18, wherein, after the slide show has started, the second message is transmitted to the external device.

20. The device of claim 17,
wherein the at least one processor is further configured to set the playing rule for the slide show, and
wherein information about the set playing rule is comprised in the first metadata group from among the plurality of metadata groups.

21. The device of claim 16,
wherein the at least one processor is further configured to set the playing rule for the slide show for each image group, and
wherein information about the playing rule set for each image group is comprised in a metadata group, which corresponds to an image group that corresponds to the playing rule.

22. The device of claim 21,
wherein the playing rule of the slide show is set for each image group, and
wherein the playing rule common to the plurality of image groups is transmitted from the device to the external device.

23. The device of claim 16, wherein the at least one processor is further configured to:
select at least one of the plurality of metadata groups,
modify the selected at least one of the plurality of metadata groups, and
control the communication interface to transmit, to the external device, information about the modifying of the selected at least one of the plurality of metadata groups.

24. The device of claim 23, wherein, as an image comprised in an image group that corresponds to the selected at least one of the plurality of metadata groups is one of modified or deleted, or as a new image is added to the image group that corresponds to the selected at least one of the plurality of metadata groups, the selected at least one of the plurality of metadata groups is modified.

25. The device of claim 24, wherein, as a playing order of an image group that corresponds to the selected at least one of the plurality of metadata groups is changed, the selected at least one of the plurality of metadata groups is modified.

26. A method of a device playing a slide show, the method comprising:
receiving, by a processor from another device, a first message comprising a first metadata group among a plurality of metadata groups for playing a plurality of images and at least one piece of music, the plurality of metadata groups being generated by the other device, which is separate from the device, in response to the other device determining the plurality of images and the at least one piece of music for the slide show;
receiving, by the processor from the other device, a second message comprising a second metadata group among the plurality of metadata groups for playing the plurality of images and the at least one piece of music;

in response to receiving the first metadata group, starting, by the processor, to play the slide show; and while the slide show is being played by the device, receiving a third message comprising a modified second metadata group generated by the other device, wherein the slide show that is being played by the device is changed based on the modified second metadata group, wherein the plurality of metadata groups respectively correspond to a plurality of image groups included in the plurality of images, wherein each of the plurality of metadata groups comprises information representing a playing rule for playing the plurality of images and the at least one piece of music together, wherein the plurality of metadata groups are used by the device to retrieve the plurality of images, retrieve the at least one piece of music, and play the slide show according to the playing rule, wherein the modified second metadata group comprises modification information to change an aspect of the slide show, wherein the plurality of images and the at least one piece of music are stored in the other device, and wherein the metadata of the first, second, and third messages comprises link information for the device to download the plurality of images and the at least one piece of music.

27. A non-transitory computer-readable storage medium having stored therein program instructions, which when executed by a computer, performs the method of claim 26.

* * * * *